US010663775B2

(12) United States Patent
Ma et al.

(10) Patent No.: US 10,663,775 B2
(45) Date of Patent: May 26, 2020

(54) DISPLAY DEVICE

(71) Applicant: BOE TECHNOLOGY GROUP CO., LTD., Beijing (CN)

(72) Inventors: Yongda Ma, Beijing (CN); Xinyin Wu, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 204 days.

(21) Appl. No.: 15/533,102

(22) PCT Filed: Nov. 11, 2016

(86) PCT No.: PCT/CN2016/105424
§ 371 (c)(1),
(2) Date: Jun. 5, 2017

(87) PCT Pub. No.: WO2017/128811
PCT Pub. Date: Aug. 3, 2017

(65) Prior Publication Data
US 2018/0052339 A1 Feb. 22, 2018

(30) Foreign Application Priority Data
Jan. 28, 2016 (CN) .................... 2016 2 0089325 U

(51) Int. Cl.
*G02F 1/1333* (2006.01)
*G02F 1/11* (2006.01)
(Continued)

(52) U.S. Cl.
CPC ............ *G02F 1/113* (2013.01); *G02F 1/0102* (2013.01); *G02F 1/0128* (2013.01); *G02F 1/133308* (2013.01); *G09F 9/00* (2013.01)

(58) Field of Classification Search
CPC .... G02F 1/13; G02F 1/1333; G02F 1/133308; G02F 2001/133311; G02F 2001/133314; G02F 2001/133317; G02F 2001/13332
See application file for complete search history.

(56) References Cited

U.S. PATENT DOCUMENTS 10,098,430 B2 * 10/2018 Pakr ....................... A45C 11/00
2006/0091773 A1    5/2006 Kim et al.
(Continued)

FOREIGN PATENT DOCUMENTS

CN    1770374 A    5/2006
CN    101038711 A    9/2007
(Continued)

OTHER PUBLICATIONS

International Search Report for Chinese international Application No. PCT/CN2016/105424 dated Jan. 24, 2017.

*Primary Examiner* — Thoi V Duong
(74) *Attorney, Agent, or Firm* — Calfee, Halter & Griswold LLP

(57) ABSTRACT

The embodiments of the present disclosure provide a display device, which relates to the display technology field and can alleviate or mitigate the problem that noise is generated by the rear housing due to vibration when the display device is displaying a picture with sound. The display device includes a display module and a rear housing cooperating with the display module. The display module includes a display surface and a non-display surface opposite to the display surface. The display device includes a buffer between the non-display surface of the display module and the rear housing.

5 Claims, 4 Drawing Sheets

(51) Int. Cl.
  *G09F 9/00* (2006.01)
  *G02F 1/01* (2006.01)

(56) References Cited

U.S. PATENT DOCUMENTS

| | | | |
|---|---|---|---|
| 2011/0077061 A1* | 3/2011 | Danze | H04M 1/185 |
| | | | 455/575.1 |
| 2014/0198474 A1* | 7/2014 | Byeon | G02F 1/133308 |
| | | | 361/809 |
| 2016/0370638 A1 | 12/2016 | Zhang | |
| 2017/0212628 A1* | 7/2017 | Lee | G06F 3/0416 |
| 2018/0052339 A1* | 2/2018 | Ma | G02F 1/0102 |

FOREIGN PATENT DOCUMENTS

| | | |
|---|---|---|
| CN | 202258158 U | 5/2012 |
| CN | 104730741 A | 6/2015 |
| CN | 205487135 U | 8/2016 |
| JP | 2015212764 A | 11/2015 |

\* cited by examiner

DISPLAY DEVICE

CROSS-REFERENCE TO RELATED APPLICATIONS

The present application is the U.S. national phase entry of PCT/CN2016/105424, with an international filling date of Nov. 11, 2016, which claims the benefit of Chinese Patent Application NO. 201620089325.6, filed on Jan. 28, 2016, the entire disclosure of which is incorporated herein by reference.

TECHNICAL FIELD

The present disclosure relates to the display technology field, in particular to a display device.

BACKGROUND

With the continuous development of display technology, the application field of display devices has also been expanding. For example, the display device may be a medium-sized or small-sized home TV, a portable computer, a mobile phone, or the like. In addition, in public places, such as a stadium, a station, a business hall, or an outdoor building, it is necessary to provide a large-sized display for displaying advertisements, performances or public announcements, etc.

However, a display device generally comprises a display module and a rear housing mounted on a non-display surface of the display module. For a large-sized display device, the size of the rear housing thereof is also relatively large. As a result, when the display device plays a picture with sound, the rear housing will vibrate with the sound vibration, resulting in a great noise and degrading user experience.

SUMMARY

Embodiments of the present disclosure provide a display device for alleviating or mitigating the problem that noise is generated due to vibration of the rear housing when the display device displays an image with sound.

The display device according to the embodiments of the present disclosure comprises a display module and a rear housing cooperating with the display module, the display module comprising a display surface and a non-display surface opposite to the display surface. The display device further comprises a buffer between the non-display surface of the display module and the rear housing.

In certain exemplary embodiments, the display surface includes a display area and a non-display area at a periphery of the display area. The buffer includes at least one of a block buffer located in a region of the non-display surface of the display module corresponding to the display area and a strip buffer located in a region of the non-display surface of the display module corresponding to the non-display area.

In certain exemplary embodiments, the display surface includes a display area and a non-display area at a periphery of the display area. The buffer includes at least one of a block buffer located in a region of the rear housing corresponding to the display area and a strip buffer located in a region of the rear housing corresponding to the non-display area.

In certain exemplary embodiments, the display surface includes a display area and a non-display area at a periphery of the display area. The buffer includes a first strip buffer fixed in a region of the display module corresponding to the non-display area and a second strip buffer fixed in a region of the rear housing corresponding to the non-display area.

In certain exemplary embodiments, the buffer further includes a first block buffer fixed in a region of the display module corresponding to the display area and a second block buffer fixed in a region of the rear housing corresponding to the display area.

In certain exemplary embodiments, the first strip buffer and the second strip buffer are arranged in a staggered manner, and the first block buffer and the second block buffer are arranged in a staggered manner.

In certain exemplary embodiments, the first strip buffer and the second strip buffer are disposed opposite to one another, and the first block buffer and the second block buffer are disposed opposite to one another, a surface of the first strip buffer facing away from the display module being in contact with a surface of the second strip buffer facing away from the rear housing, and a surface of the first block buffer facing away from the display module being in contact with a surface of the second block buffer facing away from the rear housing.

In certain exemplary embodiments, the first strip buffer and the second strip buffer disposed opposite to one another are of the same size, and the first block buffer and the second strip block disposed opposite to one another are of the same size.

In certain exemplary embodiments, the first strip buffer and the second strip buffer disposed opposite to one another are both magnetic, and the first block buffer and the second block buffer disposed opposite to one another are both magnetic.

In certain exemplary embodiments, each of the block buffer and the strip buffer is magnetic, and the display module has a metal back plate.

In certain exemplary embodiments, each of the block buffer and the strip buffer is magnetic, and the rear housing is made of metal.

In certain exemplary embodiments, the buffer comprises a rubber pad made from an elastic insulation material.

In certain exemplary embodiments, the buffer comprises a gas cushion.

DESCRIPTION OF DRAWINGS

To more clearly explain the technical solutions of the embodiments of the disclosure, a brief introduction to the drawings to be used in the description of the embodiments is hereby made. Apparently, the figures below are just some of the embodiments of the invention, and a person having an ordinary skill in the art will be able to obtain other figures on the basis of these figures without any creative effort.

DETAILED DESCRIPTION OF EMBODIMENTS

The following text will provide a clear and complete description of the technical solutions of the embodiments of the present disclosure with reference to the accompanying drawings. Obviously, the presented embodiments are merely some of the embodiments of the invention, rather than all of them. All other embodiments obtained by a person having an ordinary skill in the art based on the embodiments of the present disclosure without any creative effort fall within the scope of the present invention.

In order to more clearly illustrate theses embodiment, the following reference signs may be used hereinafter:

10—display module; 20—rear housing; 30—buffer; 101—display area; 102—non-display area; 301—first strip buffer; 302—second strip buffer; 303—first block buffer; 304—second block buffer; A—display surface of the display module; B—non-display surface of the display module.

Figure 1:
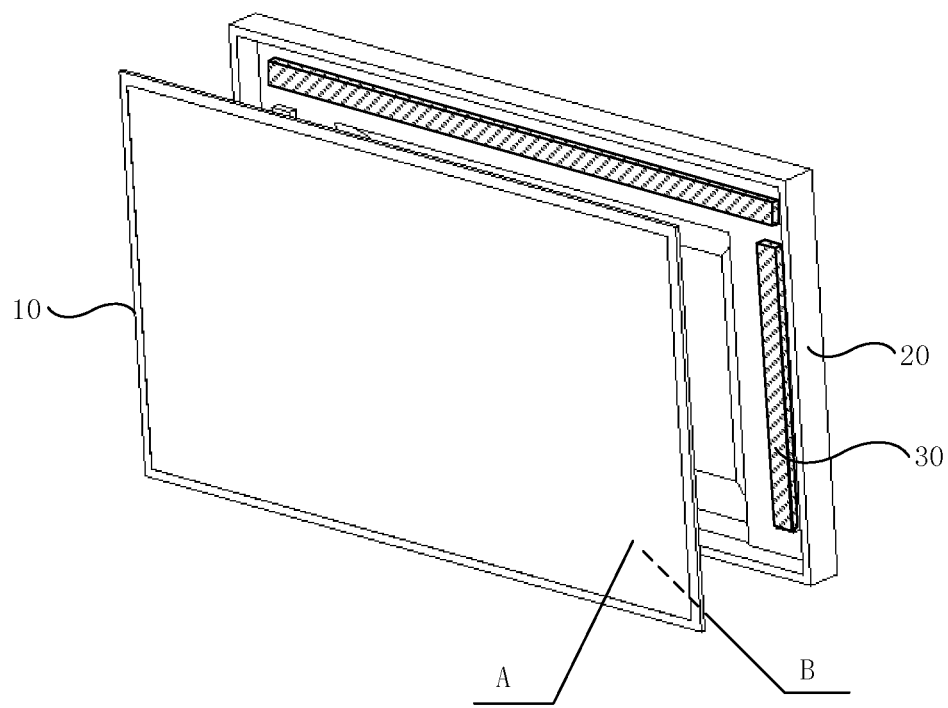
FIG. 1 is a schematic structural view of a display device provided by an embodiment of the present disclosure.

As shown in FIG. 1, an embodiment of the present disclosure provides a display device comprising a display module 10 and a rear housing 20 cooperating with the display module 10. The display module 10 comprises a display surface A for displaying images and a non-display surface B opposite to the display surface.

Figure 2:
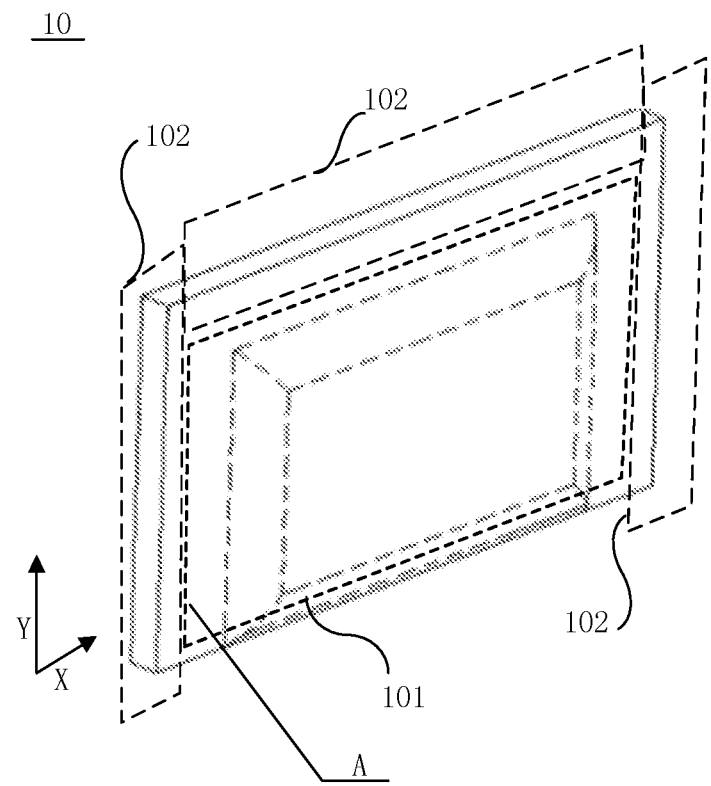
FIG. 2 is a schematic view showing the area division of the display module in FIG. 1.

As shown in FIG. 2, the display surface A includes a display area 101 and a non-display area 102 at the periphery of the display area 101. For the sake of clarity, in FIG. 2, a magnified view of the non-display area 102 is shown in a dashed box. The display area 101 may be used to display an image, and the non-display areas 102 around the display area 101 may be used for accommodating circuits for driving the display module 10 to perform image display, such as a gate drive circuit, a source drive circuit, and the like.

In the embodiment shown in FIG. 1, the display device further comprises a buffer between the non-display surface B of the display module and the rear housing 20. As a result, when the sound from the display device causes the rear housing to vibrate, the buffer would be under force and elastically deform, so as to absorb the vibration of the rear housing, which has the effect of buffering the vibration, thereby mitigating the vibration of the rear housing caused by sound vibration and further reducing the noise produced from the rear housing vibration.

Figure 3A:
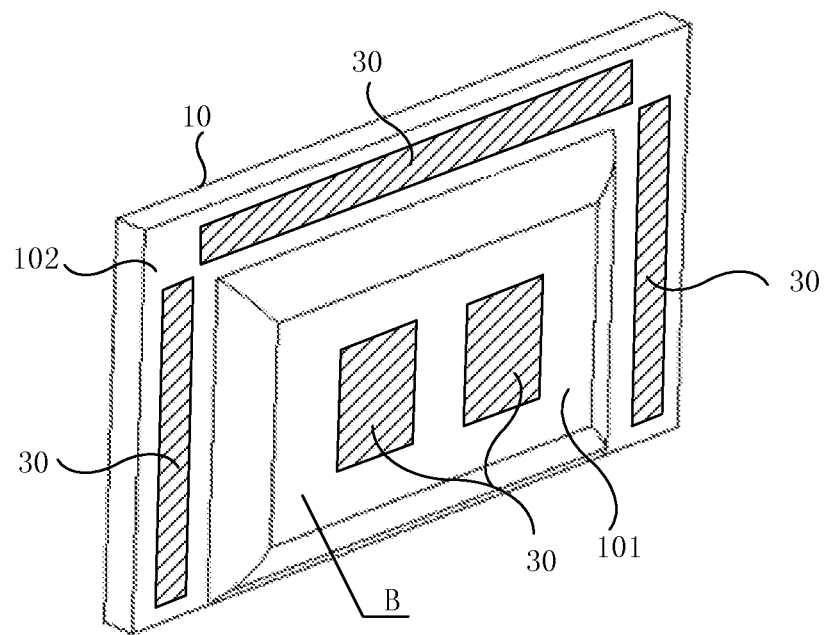
FIG. 3a is a schematic structural view showing that the display module of the display device is provided with a buffer according to an embodiment of the disclosure.

The display area 101 is typically in the shape of a block, and the non-display area 102 at the periphery of the display area 101 is usually strip-shaped. Therefore, in order to effectively utilize the space, in certain exemplary embodiments, the display surface includes a display area and a non-display area at the periphery of the display area. The buffer may include a block buffer located in a region of the non-display surface of the display module corresponding to the display area and a strip buffer located in a region of the non-display surface of the display module corresponding to the non-display area. As shown in FIG. 3a, a block buffer 30 is located in a region of the non-display surface B of the display module 10 corresponding to the display area 101, and a strip buffer 30 is located in a region of the non-display surface B of the display module 10 corresponding to the non-display area 102. In this embodiment, the extending direction of the strip buffer 30 is the same as the extending direction of the non-display area 102. It is to be understood that the non-display surface B of the display module 10 is the surface of the display module 10 adjacent to the rear housing 20.

Figure 3B:
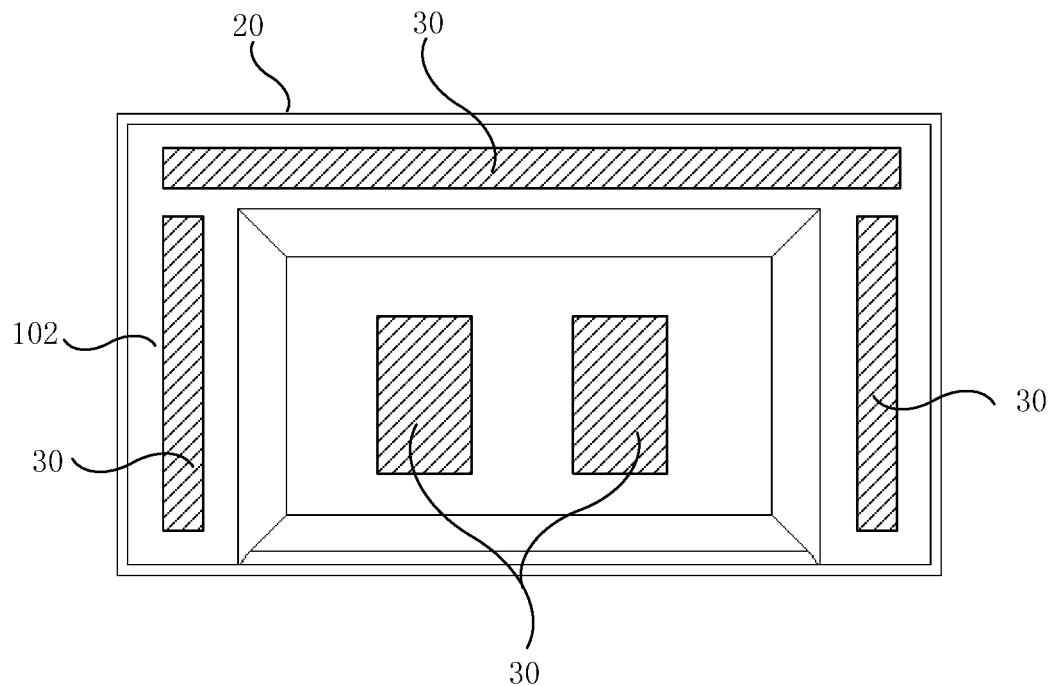
FIG. 3b is a schematic structural view showing that the rear housing of the display device is provided with a buffer according to an embodiment of the disclosure.

Alternatively, as shown in FIG. 3b, in certain exemplary embodiments, the buffer may include a block buffer 30 located in a region of the rear housing 20 corresponding to the display area 101 and a strip buffer 30 located in a region of the rear housing 20 corresponding to the non-display area 102.

Therefore, the buffer mentioned in the embodiments of the present disclosure may be provided on either the display module or the rear housing.

It is to be understood that the "strip buffer" mentioned herein refers to a buffer which exhibits an elongated shape as a whole. That is, the "strip buffer" is significantly longer in a certain direction than in another direction, so that its overall shape is similar to an elongated belt or strip. For instance, examples of the "strip buffer" include an elongated rectangular buffer that matches the shape of the non-display area on a side edge of the display module herein. Of course, the "strip buffer" may also be an elongated buffer with an irregular shape. The "block buffer" referred to herein is relative to the "strip buffer"; i.e., the sizes of the block buffer in various directions do not differ significantly as compared to the strip buffer, such that it is generally similar to a square, a circle, etc. Thus, examples of the "block buffer" include, but are not limited to, a square buffer, a circular buffer. Of course, the "block buffer" may also be a buffer having an irregular shape.

As shown in FIG. 2, the strip-like non-display areas 102 on both sides of the display area 101 extend in the Y direction, and the strip-like non-display area 102 above the display area 101 extends in the X direction. Thus, in certain exemplary embodiments, the strip-like non-display area 102 may match the shape of the strip buffer 30, in this way, one strip buffer 30 can be fixed to a corresponding position (e.g., on the surface of the rear housing 20 adjacent to the display module 10, or on the non-display surface B of the display module 10 adjacent to the rear housing) for the strip buffer 30 by, for example, one pasting step, and the fabrication process is simple and convenient.

Similarly, the block-like display area 101 may match the shape of the block buffer 30, so that several block buffers 30 are arranged in corresponding fixing positions (e.g., a surface of the rear housing 20 adjacent to the display module 10, or the non-display surface B of the display module 10 adjacent to the rear housing) for the buffer 30 by, for example, a pasting step, and the fabrication process is simple and convenient.

The above-mentioned buffer 30 may include, but is not limited to, a gas cushion, a spring or a rubber pad. A spring is generally made of metal materials, which may be harder than the materials constituting the display module 10 and the rear housing 20. In particular, the material constituting the gas cushion is rather softer, hence it will not damage the display module 10 and the rear housing 20 during the process of buffering vibration.

In certain exemplary embodiments, in case the buffer 30 is a gas cushion, the gas cushion may be filled with air or an inert gas. In certain exemplary embodiments, in case the buffer 30 is a rubber pad, since the display module 10 may be provided with some conductive thin film layers and further provided with some circuit configuration to control the display module 10 for display, the rubber pad may be made from an elastic insulation material to avoid affecting the conductive thin film layers and the circuit configuration.

As discussed above, the buffer 30 may be fixed (e.g., using a pasting process), as shown in FIG. 3a, to a surface of the display module 10 adjacent to the rear housing 20, or, as shown in FIG. 3b, to a surface of the rear housing 20 adjacent to the display module 10. Moreover, although FIG. 3a or FIG. 3b shows that buffers are provided at the same time in the regions corresponding to the display area 101 and the non-display area 102, in other embodiments, the buffer may be provided in only one of the region corresponding to the display area 101 and the region corresponding to the non-display area 102.

Thus, for the above-described embodiments of the disclosure, the buffer between the non-display surface of the display module and the rear housing may include at least one of a block buffer located in a region of the non-display surface of the display module corresponding to the display area and a strip buffer located in a region of the non-display surface of the display module corresponding to the non-display area. Alternatively, the buffer between the non-display surface of the display module and the rear housing may include at least one of a block buffer located in a region of the rear housing corresponding to the display area and a strip buffer in a region of the rear housing corresponding to the non-display area.

In addition, the above-mentioned buffer may include a first buffer fixed on the display module and a second buffer fixed on the rear housing. A surface of the first buffer away from the display module 10 is in contact with a surface of the second buffer away from the rear housing.

Figure 4:
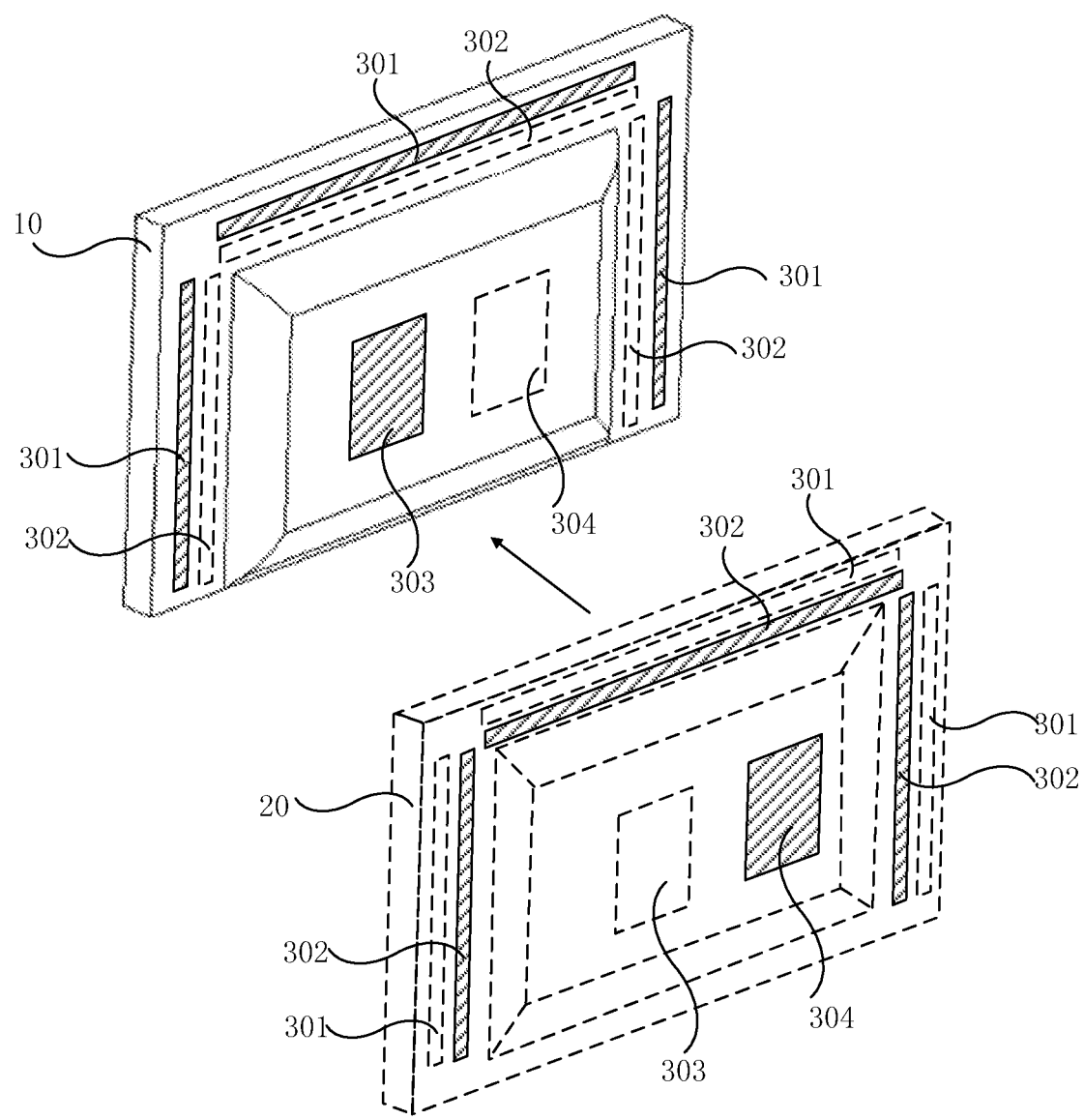
FIG. 4 is a schematic structural view showing that the display module and the rear housing of the display device are both provided with a buffer according to an embodiment of the disclosure.
Figure 5:
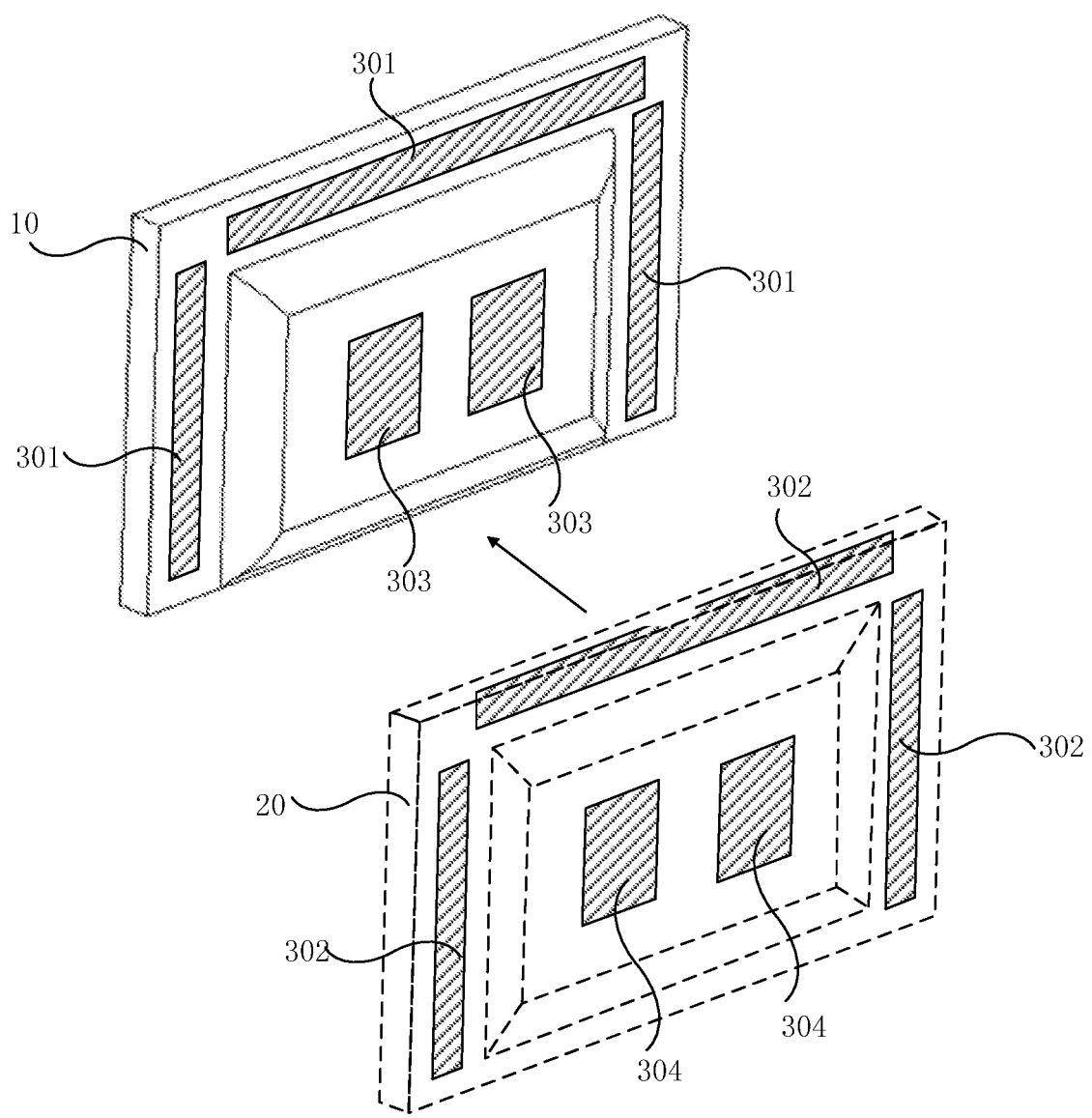
FIG. 5 is a schematic structural view showing that the display module and the rear housing of the display device are both provided with a buffer according to another embodiment of the disclosure.

In certain exemplary embodiments, as shown in FIG. 4 or FIG. 5, the buffer includes a first strip buffer 301 fixed in a region of the display module 10 corresponding to the non-display area 102 and a second strip buffer 302 fixed in a region of the rear housing 20 corresponding to the non-display area 102. Further, in the embodiment shown in FIG. 4 or FIG. 5, the buffer may also include a first block buffer 303 fixed in a region of the display module 10 corresponding to the display area 101 and a second block buffer 304 fixed in a region of the rear housing 20 corresponding to the display area 101.

In the embodiment shown in FIG. 4, the first strip buffer 301 and the second strip buffer 302 are arranged in a staggered manner, and the first block buffer 303 and the second block buffer 304 are arranged in a staggered manner.

In FIG. 4, the dashed boxes on the display module 10 represent the contact positions of the second strip buffer 302 and the second block buffer 304 fixed on the rear housing 20 with the display module 10 when the display module 10 is engaged with the rear housing 20. The dashed boxes on the rear housing 20 indicate the contact positions of the first strip buffer 301 and the first block buffer 303 fixed on the display module 10 with the rear housing 20 after the display module 10 is engaged with the rear housing 20.

Thus, in this embodiment, only one layer of buffer is formed between the display module 10 and rear housing 20 after engagement. The thickness of the buffer is dependent on the thickness of a buffer component having the maximum thickness among the all strip buffers and the all block buffers. Therefore, such embodiment may reduce the influence by the arrangement of buffers to the thickness of the entire display device.

In a further embodiment, as shown in FIG. 5, the first strip buffer 301 is disposed opposite to the second strip buffer 302, and the first block buffer 303 is disposed opposite to the second block buffer 304. Compared to the embodiment shown in FIG. 4, since the second strip buffer 302 fixed on the rear housing 20 is disposed opposite to the first strip buffer 301 fixed on the display module 10, and the second block buffer 304 fixed on the rear housing 20 is disposed opposite to the first block buffer 303 fixed on the display module 10, the thickness of the entire buffer is the sum of the thickness of the first strip buffer 301 and the second strip buffer 302 disposed opposite to one another, or the sum of the thicknesses of the first block buffer 303 and the second block buffer 304 disposed opposite to one another. However, since two layers of buffers are provided between the display module 10 and the rear housing 20 after engagement, much better buffering effect can be achieved, and the noise generated from the rear housing vibration can be further reduced. Hence, in the embodiment of FIG. 5, the first strip buffer 301 is disposed opposite to the second strip buffer 302, and the first block buffer 303 is disposed opposite to the second block buffer 304, a surface of the first strip buffer 301 away from the display module 10 being in contact with a surface of the second strip buffer 302 away from the rear housing 20, and a surface of the first block buffer 303 away from the display module 10 being in contact with a surface of the second block buffer 304 away from the rear housing 20.

Further, in certain exemplary embodiments, the first strip buffer and second strip buffer oppositely disposed are of the same size, and the first block buffer and second block buffer oppositely disposed are of the same size.

For example, when the display module 10 is engaged with the rear housing 20, in the display area 101 shown in FIG. 2, the shape of the buffer fixed on the rear housing 20 and that of the buffer fixed on the display module 10 are both block-like, and the two oppositely disposed block-like buffers are of the same size.

Alternatively, when the display module 10 is engaged with the rear housing 20, in the non-display area 102 shown in FIG. 2, the shape of the buffer fixed on the rear housing 20 and that of the buffer fixed on the display module 10 are both strip-like, and the two oppositely disposed strip-like buffers are of the same size.

In this way, it is possible to increase the effective contact area for the two oppositely disposed buffers, thereby improving the buffering effect.

In addition, in certain exemplary embodiments, the first strip buffer 301 and second strip buffer 302 oppositely disposed may both be magnetic, and the first block buffer 303 and second block buffer 304 oppositely disposed are both magnetic. Thus, if the magnetic properties of the first buffer and the second buffer are different, there is a attraction force between the display module 10 and the rear housing 20. In this case, when the sound from the display device causes the rear housing to vibrate, the attraction force between the oppositely disposed first and second buffers can offset some or even all of the vibration of the rear housing 20, so that the buffering effect of the buffer 30 can be further improved.

Alternatively, if the magnetic properties of the oppositely disposed first buffer and second buffer are the same, there is a repulsive force between the display module 10 and the rear housing 20. In this case, when the sound from the display device causes the rear housing to vibrate, the repulsive force between the oppositely disposed first and second buffers can offset some or even all of the vibration of the rear housing 20, so that the buffering effect of the buffer 30 can be further improved.

As described above, thus in a further embodiment, a block buffer or a strip buffer may be provided only on a surface of the display module, in which case the block buffer and the strip buffer may be magnetic and the display module may have a metal back plate. Alternatively, in certain exemplary embodiments, a block buffer or a strip buffer may be provided only on a surface of the rear housing, in which case the block buffer and the strip buffer may be magnetic and the rear housing is made of metal.

The above are merely specific embodiments of the present invention, and the scope of the present invention is not limited thereto. Any variances and replacements easily conceivable by a person skilled in the art within the scope of the invention shall be covered by the scope of the invention. Accordingly, the scope of the present invention shall be determined by the scope of the appended claims.

The invention claimed is:

1. A display device comprising: a display module and a rear housing cooperating with the display module, wherein the display module comprises a display surface and a non-display surface opposite to the display surface, and wherein the display device further comprises a buffer between the non-display surface of the display module and the rear housing, wherein the display surface includes a display area and a non-display area at a periphery of the display area, and wherein the buffer includes a first strip buffer fixed in a region of the display module corresponding to the non-display area and a second strip buffer fixed in a region of the rear housing corresponding to the non-display area, wherein the buffer further includes a first block buffer fixed in a region of the display module corresponding to the display area and a second block buffer fixed in a region of the rear housing corresponding to the display area, and wherein the first strip buffer and the second strip buffer are disposed opposite to one another, and the first block buffer and the second block buffer are disposed opposite to one another, a surface of the first strip buffer facing away from the display module being in contact with a surface of the second strip buffer facing away from the rear housing, and a surface of the first block buffer facing away from the display module being in contact with a surface of the second block buffer facing away from the rear housing.

2. The display device according to claim 1, wherein the first strip buffer and the second strip buffer disposed opposite to one another are of the same size, and the first block buffer and the second strip block disposed opposite to one another are of the same size.

3. The display device according to claim 1, wherein the first strip buffer and the second strip buffer disposed opposite to one another are both magnetic, and the first block buffer and the second block buffer disposed opposite to one another are both magnetic.

4. A display device according to claim 1, wherein the buffer comprises a rubber pad made from an elastic insulation material.

5. A display device according to claim 1, wherein the buffer comprises a gas cushion.

* * * * *